(12) United States Patent
Niu et al.

(10) Patent No.: US 8,934,330 B2
(45) Date of Patent: Jan. 13, 2015

(54) METHOD AND APPARATUS FOR CHANNEL ESTIMATION

(75) Inventors: Ben Niu, Beijing (CN); Gang Liu, Beijing (CN); Li Zou, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/519,577

(22) PCT Filed: Dec. 29, 2009

(86) PCT No.: PCT/CN2009/001574
§ 371 (c)(1),
(2), (4) Date: Jun. 27, 2012

(87) PCT Pub. No.: WO2011/079411
PCT Pub. Date: Jul. 7, 2011

(65) Prior Publication Data
US 2012/0287803 A1   Nov. 15, 2012

(51) Int. Cl.
*H04J 11/00* (2006.01)
*H04L 25/02* (2006.01)
*H04L 27/26* (2006.01)

(52) U.S. Cl.
CPC ........ *H04L 27/2647* (2013.01); *H04L 25/0232* (2013.01); *H04L 25/022* (2013.01); *H04L 25/0204* (2013.01); *H04L 25/0222* (2013.01)
USPC ........... 370/210; 370/335; 370/342; 370/260; 370/208; 370/503; 375/267; 375/260

(58) Field of Classification Search
CPC ... H04L 25/22; H04L 27/2662; H04L 1/0025; H04L 25/0204; H04L 27/2647; H04L 27/28; H04J 1/04

USPC ......... 370/206–208, 210, 260, 267, 305, 335, 370/342, 430, 480, 481, 491, 503, 509, 370/512–515; 375/267
See application file for complete search history.

(56) References Cited

U.S. PATENT DOCUMENTS

| 7,970,070 B2 * | 6/2011 | Yousef et al. ................ 375/260 |
| 8,165,229 B2 | 4/2012 | Paik et al. |
| 8,374,285 B2 * | 2/2013 | Ikram et al. .................. 375/316 |

(Continued)

FOREIGN PATENT DOCUMENTS

| CN | 101589590 | 11/2009 |
| EP | 1528740 | 5/2005 |

(Continued)

OTHER PUBLICATIONS

Search Rpt: Oct. 28, 2010.
Liu et al.. "Adaptive-channel-estimation-aigorithrn-for-DVB-T/H-systems", Computer Engineering and Applications, vol. 42, No. 31, Nov. 1, 2005, pp. 117-193, English Abstract.

*Primary Examiner* — Chandrahas Patel
*Assistant Examiner* — Lan Huong Truong
(74) *Attorney, Agent, or Firm* — Tutunjian & Bitetto, P.C.

(57) ABSTRACT

The present invention provides a method for channel estimation used in a receiver of a multi-carrier communication system, including: receiving a multi-carrier symbols from a transmitter of the multi-carrier communication system; and obtaining channel information of sub-carriers carrying data of the multi-carrier symbols, using selectively time direction interpolation and frequency direction interpolation for channel information of a plurality of scatter pilots of the multi-carrier symbols.

4 Claims, 4 Drawing Sheets

(56) References Cited

U.S. PATENT DOCUMENTS

| | | | |
|---|---|---|---|
| 2003/0214927 A1* | 11/2003 | Atarashi et al. | 370/335 |
| 2006/0109919 A1 | 5/2006 | Nieto | |
| 2006/0120467 A1* | 6/2006 | Miyoshi et al. | 375/260 |
| 2007/0070882 A1* | 3/2007 | Kawauchi et al. | 370/210 |
| 2007/0076804 A1* | 4/2007 | Sestok et al. | 375/260 |
| 2007/0127582 A1 | 6/2007 | Lee et al. | |
| 2007/0211747 A1* | 9/2007 | Kim | 370/437 |
| 2007/0242761 A1 | 10/2007 | Yang | |
| 2009/0280747 A1* | 11/2009 | Sudarshan et al. | 455/63.1 |
| 2009/0285314 A1 | 11/2009 | Yousef et al. | |
| 2010/0008443 A1* | 1/2010 | Casamajou | 375/267 |

FOREIGN PATENT DOCUMENTS

| | | |
|---|---|---|
| JP | 2003087153 | 3/2003 |
| JP | 1738299 | 2/2006 |
| JP | 2008167116 | 7/2008 |
| JP | 2008227622 | 9/2008 |
| JP | 1980487 | 10/2008 |
| JP | 2009188603 | 8/2009 |
| KR | 20080044721 | 5/2008 |
| WO | WO2008093253 | 8/2008 |

* cited by examiner

US 8,934,330 B2

METHOD AND APPARATUS FOR CHANNEL ESTIMATION

This application claims the benefit, under 35 U.S.C. §365 of International Application PCT/CN2009/001574, filed Dec. 29, 2009, which was published in accordance with PCT Article 21(2) on Jul. 7, 2011 in English.

FIELD OF THE INVENTION

The present invention relates in general to a multi-carrier communication system, and more particularly to a channel estimation method and apparatus for an Orthogonal Frequency Division Multiplexing (OFDM) communication system.

BACKGROUND OF THE INVENTION

Orthogonal Frequency Division Multiplexing (OFDM) is a typical multi-carrier modulation technology and a very promising access scheme for wideband wireless communication networks. OFDM has been adopted by numbers of international standards such as DVB (Digital Video Broadcasting) and wireless LAN (Local Area Network). It is also a promising technique for future wideband wireless communication systems, such as digital TV (Television) broadcasting and 4th generation wireless networks.

DVB-T is the European terrestrial digital TV standard. It has gained great success in a lot of countries. Conventionally DVB-T is used for fixed TV services. Recently mobile receiving becomes more important, such as mobile TV on car or train. On the other hand, TV on cell phone is an important application of digital TV. DVB-H is the European standard of handheld digital TV, and it also needs to face the mobile receiving problem. But the performance of DVB-T receivers designed for fixed receiving degrades sharply as the speed of the receivers ascending. So it is a challenging problem to make the DVB-T/H receivers work well in high speed environments.

SUMMARY OF THE INVENTION

The invention concerns a method for channel estimation used in a receiver of a multi-carrier communication system, including: receiving multi-carrier symbols from a transmitter of the multi-carrier communication system; and obtaining channel information of sub-carriers carrying data of the multi-carrier symbols, using selectively time direction interpolation and frequency direction interpolation for channel information of a plurality of scatter pilots of the multi-carrier symbols.

The invention also concerns a receiver in a multi-carrier communication system, including: a channel estimator for obtaining channel information of sub-carriers carrying data of multi-carrier symbols received from a transmitter of the multi-carrier communication system, using selectively time direction interpolation and frequency direction interpolation for channel information of a plurality of scatter pilots of the multi-carrier symbols.

BRIEF DESCRIPTION OF DRAWINGS

These and other aspects, features and advantages of the present invention will become apparent from the following description in connection with the accompanying drawings, among which.

DETAIL DESCRIPTION OF PREFERRED EMBODIMENTS

A description will now be given with reference to the attached figures to illustrate many advantages/features of the present invention, according to an illustrative embodiment.

In a mobile receiving system, the channel is time-variant, which is the main difference with a fixed receiving system. Conventional channel estimation modules designed for DVB-T can work well in time-invariant channels, but they can't track time-variant channels, which is a main reason that the fixed DVB-T receivers can't work well in mobile environments. In a DVB-T/H OFDM system, the channel estimation assumes that the channel is time-invariant, so it can't track the time direction variation. Therefore, when moving speed of the mobile receiving system is high, the performance of channel estimation will degrade severely. So an effective method of channel estimation is very important for mobile DVB-T/H receivers.

Figure 1:
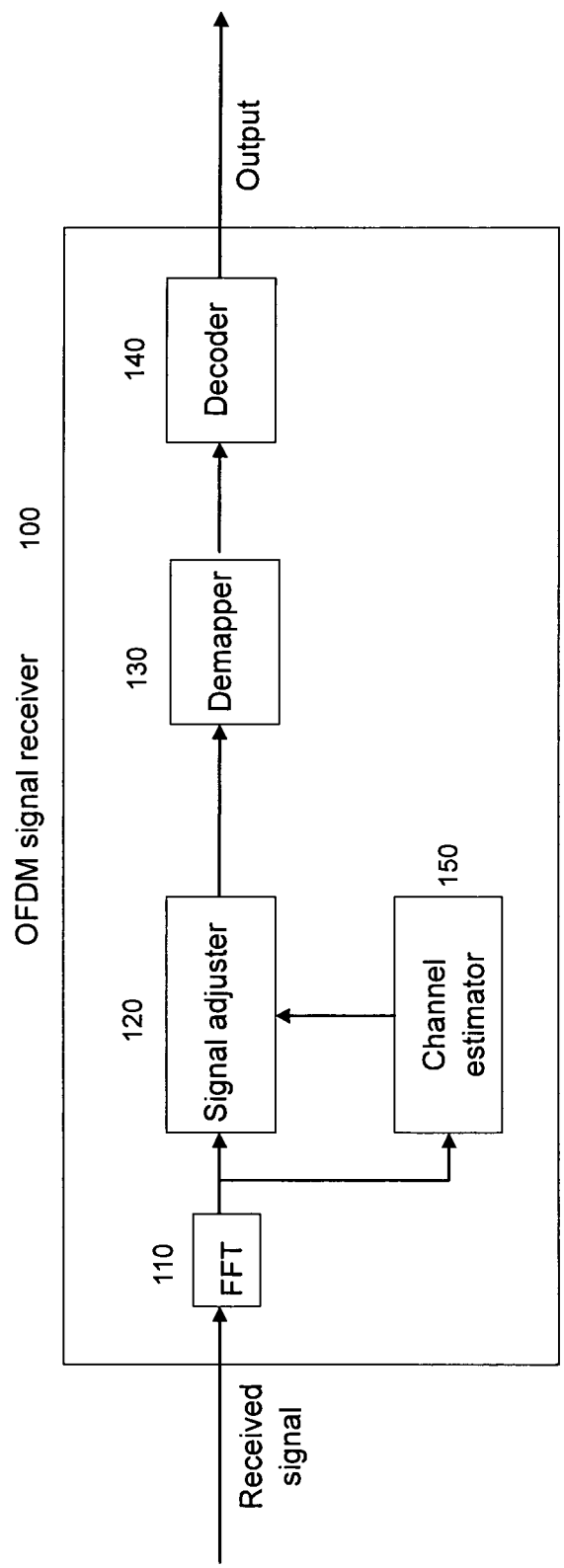
FIG. 1 shows a block diagram of an OFDM receiver in which the embodiment of the invention can be implemented.

Referring to FIG. 1, which is a block diagram of an example of an OFDM signal receiver 100 in which the embodiment of the invention can be implemented. The receiver 100 includes a Fast Fourier Transform (FFT) module 110, a signal adjuster 120, a channel estimator (CE) 150, a demapper 130 and a decoder 140. The FFT module 110 transforms a received and demodulated OFDM signal to generate a transformed signal in frequency domain. The output of FFT module 110 is supplied to the channel estimator 150, and is also supplied to the signal adjuster 120. The signal adjuster 120 is used to adjust the OFDM signal according to the estimation result from the channel estimator 150. The output of the signal adjuster 120 is supplied to the demapper 130 and decoder 140 to get the demapped and decoded output signal.

Figure 2:
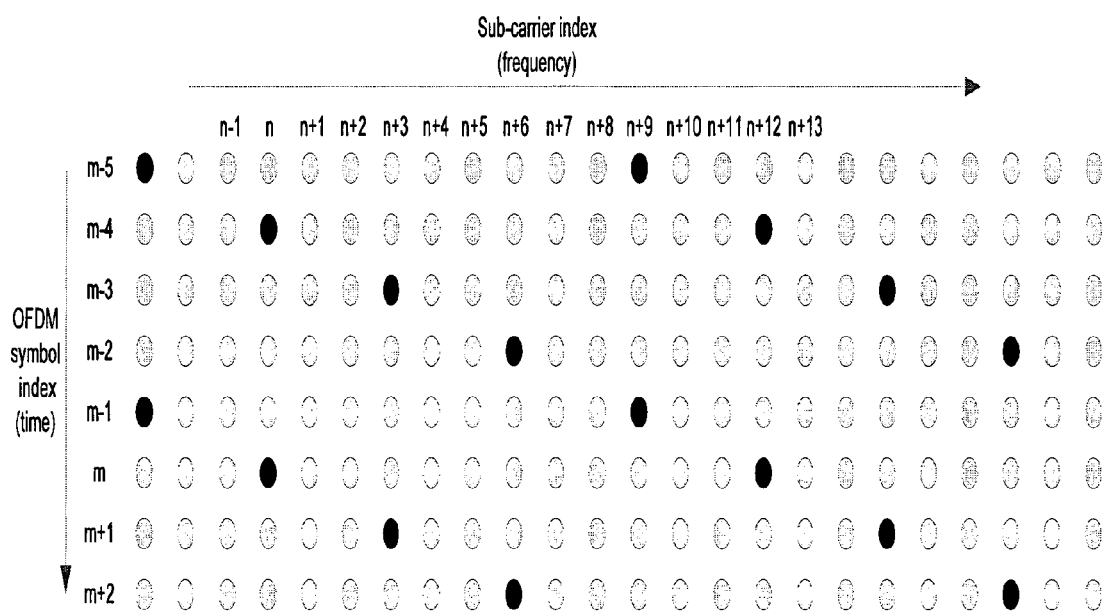
FIG. 2 shows the pattern of OFDM symbols with scatter pilots in DVB-T systems.

In general, some scatter pilots are inserted into the OFDM symbols at the transmitter site of the OFDM system, where "pilot" means a reference signal used by both the transmitter and the receiver. FIG. 2 shows the pattern of OFDM symbols with scatter pilots in DVB-T systems. As shown in FIG. 2, the black points are scatter pilots, and the other white points are the received data from the transmitter site. The horizontal rows are OFDM symbols comprising a plurality of sub-carriers, arranged in vertical time direction. OFDM symbols m−5, m−4, to m+2 are shown in FIG. 2, and each OFDM symbol includes sub-carriers with different frequency. In a given symbol, there is a scatter pilot every 12 sub-carriers.

At the receiver site, Channel State Information (CSI) at the scatter pilots is calculated firstly. For example, a known scatter pilot signal at the transmitter site is x(k), and in the receiver this scatter pilot −y(k) is received. So the transmitted signal x(k) becomes to y(k) because of the impact of the channel. The CSI is obtained as y(k)/x(k), where k is the index of the sub-carrier. So the CSI on the scatter pilots every 12 sub-carriers can be obtained by a simple division calculation. Then the channel estimation is used to get the CSI of all necessary sub-carriers of the OFDM signal by interpolating in both time domain and frequency domain. The interpolating method according to an embodiment of the invention will be described in detail based on FIG. 3.

Figure 3:
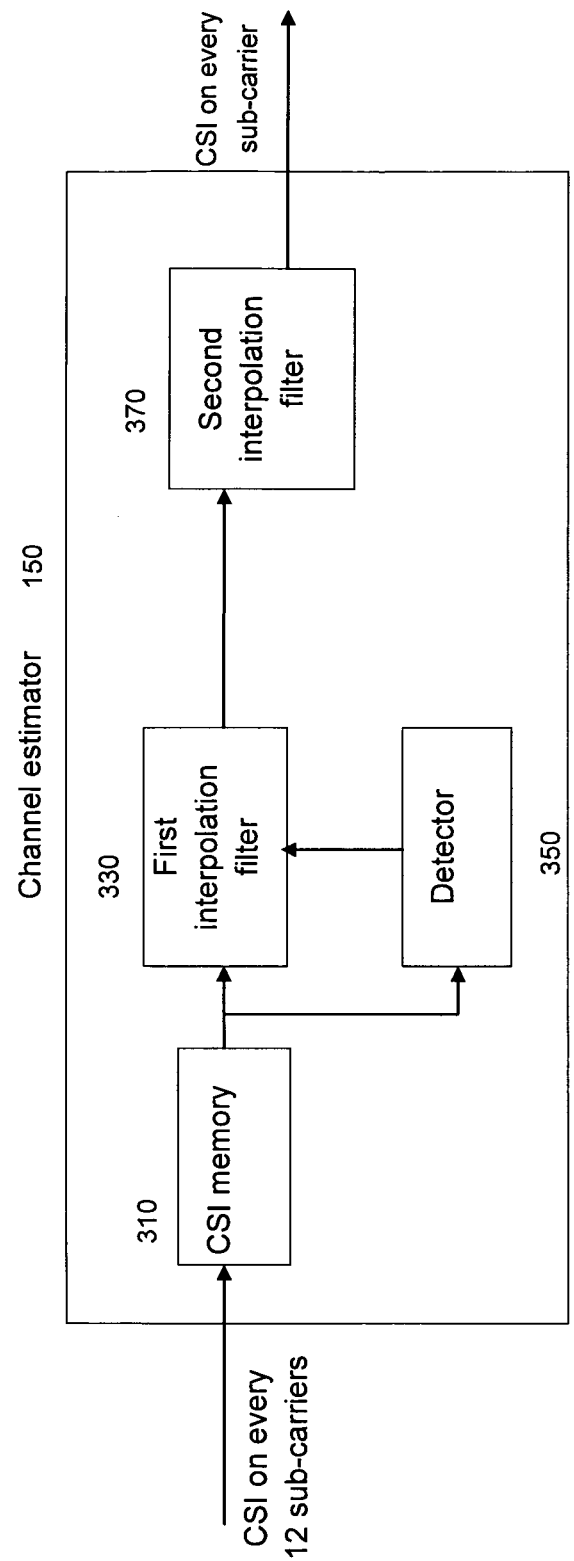
FIG. 3 shows a block diagram of a channel estimator according to an embodiment of the invention.

FIG. 3 shows a block diagram of the channel estimator 150 according to an embodiment of the invention. The channel estimator 150 includes a CSI memory 310, a detector 350, a first interpolation filter 330, and a frequency interpolation filter 370. The inputs of the channel estimator 300 are CSI values of the scatter pilots on every 12 sub-carriers of the OFDM symbols. These CSI values are buffered in the CSI memory 310. The CSI memory 310 can buffer the scatter pilot CSI values of several preceding OFDM symbols for interpolation calculation. When the CSI of a new OFDM symbol is inputted, the oldest CSI is updated. So the CSI memory 310 always keeps the CSI values of several latest OFDM symbols. These CSI values are used to do the interpolation calculation, so as to get the CSI of other sub-carriers.

The detector 350 is used to detect the channel parameters, such as Doppler frequency and multi-path delay. The detector 350 can be implemented as both a Doppler frequency detector and a multi-path delay detector or separate devices, or a Doppler frequency module and a multi-path delay module. In the OFDM receiver according to the embodiment, Doppler frequency detector or module usually detects the Doppler frequency by doing the correlation between the received pilot signals, which are on the same sub-carrier but different OFDM symbols, that is, the pilot signals for correlation are on the same frequency domain points but different time domain points. Since the Doppler frequency is proportional to the correlation values, the Doppler frequency can be obtained from these correlation values. In addition, the multi-path delay detector or module usually does the IDFT (Inverse Discrete Fourier Transform) of the CSI values on the scatter pilots to get the CIR (channel Impulse Response). Then the first and last paths can be found on the CIR, the distance between the first and last paths is the multi-path delay. Usually in this way, the multi-path delay can be detected by the multi-path delay detector or module.

According to the channel parameters from the detector 350, the first interpolation filter 330 obtains the CSI on every 3 sub-carriers of the OFDM symbols from the CSI of a plurality of scatter pilots, selectively using time direction interpolation and frequency direction interpolation method. When the detected Doppler frequency is high, and the multi-path delay is low, the frequency direction interpolation algorithm is used by the first interpolation filter 330 to get CSI on every 3 sub-carriers. According to the embodiment, a predetermined threshold, for example 80 Hz for 8K mode in DVB-T system, is set for the detected Doppler frequency. In addition, a multi-path delay threshold is set based on the maximum tolerable multi-path delay of the multi-carrier system. If the detected Doppler frequency is higher than the threshold 80 Hz, and the multi-path delay is less than the multi-path delay threshold, the first interpolation filter 330 adopts the frequency direction interpolation algorithm. Otherwise, the time direction interpolation is selected by the first interpolation filter 330 to calculate the CSI on every 3 sub-carriers of the OFDM symbols using the CSI of a plurality of scatter pilots.

According to the embodiment, when the time direction interpolation is selected, taking the OFDM symbol m as an example, as shown in FIG. 2, a linear time direction interpolation can be completed to obtain the CSI of the sub-carrier n+12+3 and n+12+6 using the following equations:

$$\text{csi\_t\_int } p(m, n+12+3) = \frac{3}{4}\text{SP\_csi}(m+1, n+12+3) + \frac{1}{4}\text{SP\_csi}(m-3, n+12+3) \quad (1)$$

$$\text{csi\_t\_int } p(m, n+12+6) = \frac{1}{2}\text{SP\_csi}(m-2, n+12+6) + \frac{1}{2}\text{SP\_csi}(m+2, n+12+6) \quad (2)$$

Where csi_t_int p(m,n) is the interpolated CSI value on the sub-carrier with index n in the OFDM symbol with index m. SP_csi(m,n) is the known CSI value from scatter pilot on the sub-carrier with index n in the OFDM symbol with index m. The known CSI values on the scatter pilots are saved in CSI memory 310, they can be read from the memory for interpolation calculation.

In order to improve the performance of time direction interpolation, the adjustable parameters A and B are set in the equations according to the channel Doppler frequency as follows:

$$\text{csi\_t\_int } p(m, n+12+3) = \left[\frac{3}{4}\text{SP\_csi}(m+1, n+12+3) + \frac{1}{4}\text{SP\_csi}(m-3, n+12+3)\right] * B \quad (3)$$

$$\text{csi\_t\_int } p(m, n+12+6) = \left[\frac{1}{2}\text{SP\_csi}(m-2, n+12+6) + \frac{1}{2}\text{SP\_csi}(m+2, n+12+6)\right] * B \quad (4)$$

$$\text{csi\_t\_int } p(m, n+12+9) = [(A+1)*\text{SP\_csi}(m-1, n+12+9) - A*\text{SP\_csi}(m-5, n+12+9)] * B \quad (5)$$

For example, according to the embodiment, we can set several Doppler frequency intervals, 0~30 Hz, 30~60 Hz, 60~80 Hz and above 80 Hz. We can find out the appropriate parameters A and B for these intervals respectively. For example, in simulation and practical hardware test, when Doppler frequency is 0~30 Hz, it can get the lowest BER (Bit Error Rate) by setting A=0.25, B=1. When Doppler frequency is 30~60 Hz, it can get the lowest BER by setting A=0.35, B=1. When Doppler frequency is 60~80 Hz, it can get the lowest BER by setting A=0.5, B=0.977. When Doppler frequency is above 80 Hz, it can get the lowest BER by setting A=0.7, B=0.966. Then we can pre-store these sets of parameters A and B for corresponding Doppler frequency intervals, and select the appropriate sets of A and B for current detected Doppler frequency. For example, the detected Doppler frequency is 45 Hz, we can select A=0.35, B=1. In this way, the system BER performance can be optimized.

Figure 4:
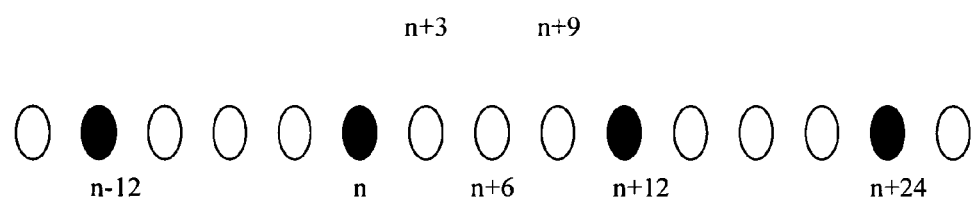
FIG. 4 shows an embodiment of the frequency direction interpolation in the first interpolation filter of the channel estimator according to the embodiment of the invention.

FIG. 4 shows an embodiment of the frequency direction interpolation in the first interpolation filter 330. As shown in FIG. 4, the frequency interpolation algorithm just uses the known CSI of the scatter pilots in the current OFDM symbol to obtain the CSI values every 3 sub-carriers by the known CSI on the pilots, and it doesn't need the known CSI from other OFDM symbols. As shown in FIG. 4, if we want to obtain the CSI values every 3 sub-carriers in OFDM symbol with index m, we just need to use the known CSI value of the scatter pilot in OFDM symbol with index m. For example, we can use SP_csi(m,n−12), SP_csi(m,n), SP_csi(m,n+12) and SP_csi(m,n+24) to interpolate the CSI values on sub-carriers with index n+3, n+6 and n+9 in OFDM symbol with index m. For example, we can use a forth order interpolation.

$$SP\_csi(m,n+3) = W_{11} \cdot SP\_csi(m,n-12) + W_{12} \cdot SP\_csi(m,n) + W_{13} \cdot SP\_csi(m,n+12) + W_{14} \cdot SP\_csi(m,n+24) \quad (6)$$

$$SP\_csi(m,n+6)=W_{21} \cdot SP\_csi(m,n-12)+W_{22} \cdot SP\_csi(m,n)+W_{23} \cdot SP\_csi(m,n+12)+W_{24} \cdot SP\_csi(m,n+24) \quad (7)$$

$$SP\_csi(m,n+9)=W_{31} \cdot SP\_csi(m,n-12)+W_{32} \cdot SP\_csi(m,n)+W_{33} \cdot SP\_csi(m,n+12)+W_{34} \cdot SP\_csi(m,n+24) \quad (8)$$

As to how many known CSI values to be used, it can be decided according to the performance requirement by one skilled in the art. In addition, the interpolation filter coefficients W can be the above ½, ¼, and ¾, in linear interpolation method, and also can be designed based on MMSE (Minimum Mean Square Error) criterion or a low pass filter which have better performance than linear interpolation. Several sets of coefficients can be designed for different multi-path delay and the appropriate coefficients can be selected according to the detected multi-path delay.

Because the interpolation algorithms may be often switched according to the channel environments and channel parameters, the switch must be implemented smoothly. The time direction predicting algorithm causes two OFDM symbols delay and the frequency algorithm can calculate the CSI in the current OFDM symbol according to the inputted known CSI, so the frequency algorithm must be delayed two symbols deliberately. For example, when the OFDM symbol with index m+2 arrives, the CSI every 3 sub-carriers in OFDM symbol with index m can be calculated using the time predicting algorithm. If it is switched to frequency algorithm, it must save the latest inputted CSI in OFDM symbol with index m+2 to CSI memory 310 and read the know CSI in OFDM symbol m from the CSI memory to calculate the CSI every 3 sub-carriers in OFDM symbol m. In this way, the switch between two algorithms will not cause the interrupt.

The output of the first interpolation filter 330 is input to a second interpolation filter 370, which is a frequency interpolation filter, to obtain the CSI on every or necessary sub-carriers. The frequency interpolation calculation method is the same as the first interpolation filter 330.

According to the embodiment, the interpolation method is implemented by two separate filters 330 and 370, and two-step interpolation. However, when the Doppler frequency is high and the multi-path delay is low, one frequency interpolation filter can be used to do the calculation from CSI on every 12 sub-carriers to CSI on every or necessary sub-carriers. But the one-step frequency interpolation needs a lot of different hardware and parameters memory if it is also used to do the time direction predicting algorithm and can switch between the two methods. In the above embodiment, the Only-frequency algorithm has been divided into two steps, the second step calculation of the two algorithms are the same. So the second step calculation hardware can be reused, so it saves a lot of hardware complexity.

Figure 5:
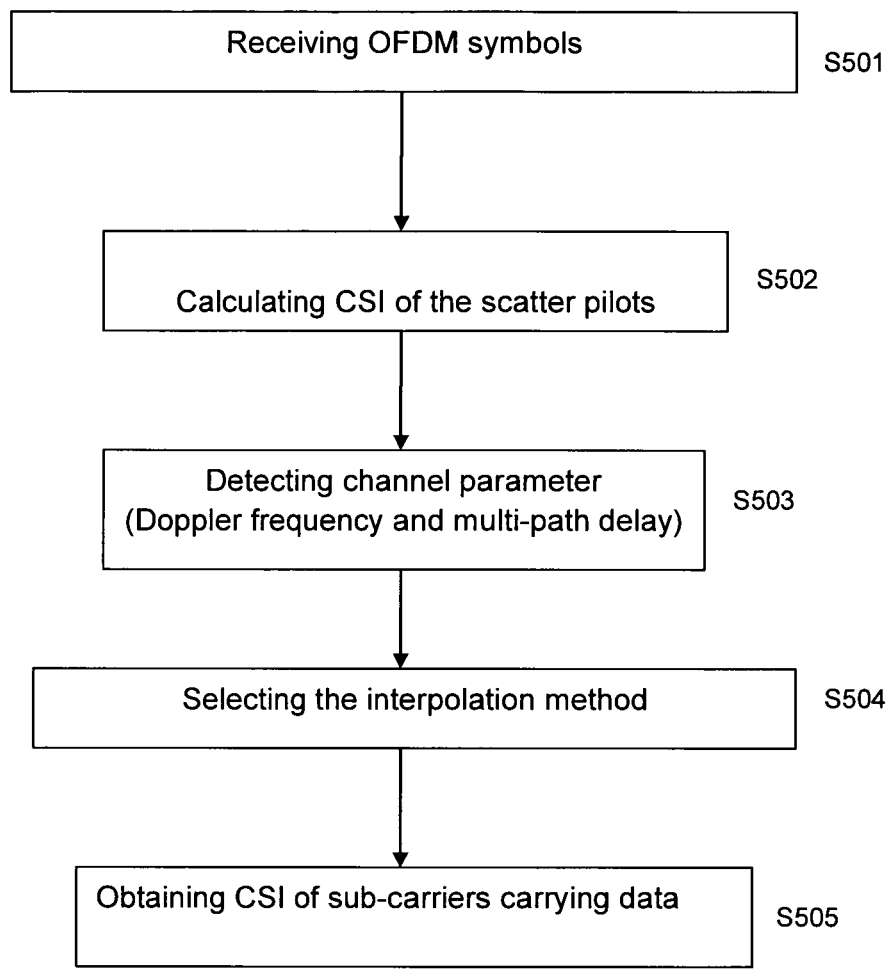
FIG. 5 is a flow chart showing a method for channel estimation according to the embodiment of the invention.

FIG. 5 is a flow chart showing a method for channel estimation according to the embodiment of the invention. At step 501, the OFDM receiver receives OFDM symbols from the communication network. Then at step 502, the channel state information of the scatter pilots is calculated, and then saved into the CSI memory 310. At step 503, the detector 330 detects the channel parameters, for example Doppler frequency and multi-path delay. According to the channel parameters, a suitable interpolation method is selected at step 504. The interpolation method can be a two-step frequency direction interpolation method or a time direction interpolation method plus a frequency direction interpolation method. Using the selected interpolation method, the CSI of every or necessary sub-carriers can be obtained at step 505.

Although an OFDM system and OFDM symbols are used as an embodiment, one skilled in the art knows that the method of interpolation method of the embodiment can be used for any multi-carrier system and multi-carrier symbol.

The foregoing merely illustrates the embodiment of the invention and it will thus be appreciated that those skilled in the art will be able to devise numerous alternative arrangements which, although not explicitly described herein, embody the principles of the invention and are within its spirit and scope.

The invention claimed is:

1. A method for channel estimation used in a receiver of a multi-carrier communication system, including:
   receiving multi-carrier symbols from a transmitter of the multi-carrier communication system, wherein, data of the multi-carrier symbols is carried by sub-carriers; and
   obtaining channel information of at least one of the sub-carriers from channel information of at least two scatter pilots of the multi-carrier symbols by selectively using time direction interpolation and frequency direction interpolation, wherein, the time direction interpolation and the frequency direction interpolation are selected according to Doppler frequency and multi-path delay, wherein the frequency direction interpolation is delayed by the same number of multi-carrier symbols as caused by the time direction interpolation;
   wherein if the Doppler frequency is higher than a first predetermined threshold, and the multi-path delay is lower than a second predetermined threshold, the frequency direction interpolation is selected; otherwise, the time direction interpolation plus the frequency direction interpolation are selected.

2. The method according to the claim 1, wherein the channel information of the plurality of scatter pilots is calculated from the received multi-carrier symbols and the corresponding multi-carrier symbols at the transmitter.

3. A receiver in a multi-carrier communication system, including:
   a channel estimator for obtaining channel information of at least one of sub-carriers carrying data of multi-carrier symbols received from a transmitter of the multi-carrier communication system from channel information of at least two scatter pilots of the multi-carrier symbols by selectively using time direction interpolation and frequency direction interpolation, wherein, the time direction interpolation and the frequency direction interpolation are selected according to Doppler frequency and multi-path delay, wherein the frequency direction interpolation is delayed by the same number of multi-carrier symbols as caused by the time direction interpolation;
   wherein if the Doppler frequency is higher than a first predetermined threshold, and the multi-path delay is lower than a second predetermined threshold, the frequency direction interpolation is selected to obtain the channel information of the sub-carriers carrying data; otherwise, the time direction interpolation plus the frequency direction interpolation are selected.

4. The receiver according to the claim 3, wherein the channel information of the plurality of scatter pilots is calculated from the received multi-carrier symbols and the corresponding multi-carrier symbols at the transmitter.

* * * * *